United States Patent
Albertone et al.

(10) Patent No.: US 7,285,324 B1
(45) Date of Patent: Oct. 23, 2007

(54) LAMINATE STRUCTURE

(75) Inventors: Yannick Albertone, Paris (FR); Mark Andrew Young, Herdfordshire (GB); Jacques Gilbert, Paris (FR); George Ostapchenko, Salem, SC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/670,529

(22) Filed: Sep. 27, 2000

Related U.S. Application Data

(60) Provisional application No. 60/156,168, filed on Sep. 27, 1999.

(51) Int. Cl.
- B32B 7/02 (2006.01)
- B32B 27/32 (2006.01)
- B32B 5/18 (2006.01)
- B32B 27/12 (2006.01)

(52) U.S. Cl. .......... 428/213; 428/220; 442/76; 442/149; 442/286; 442/287; 442/290; 442/394; 442/395; 442/396; 442/398

(58) Field of Classification Search ........ 442/149, 442/76, 394, 395, 396, 398, 286, 287, 290; 428/213, 220
See application file for complete search history.

(56) References Cited

U.S. PATENT DOCUMENTS

| | | |
|---|---|---|
| 4,452,848 A | 6/1984 | Geiger |
| 4,493,870 A | 1/1985 | Vrouenraets et al. |
| 4,725,481 A | 2/1988 | Opstapchenko |
| 4,739,012 A | 4/1988 | Hagman |
| 4,939,009 A | 7/1990 | Beavers et al. |
| 5,102,711 A | 4/1992 | Keller et al. |
| 5,407,713 A * | 4/1995 | Wilfong et al. ............ 428/34.1 |

(Continued)

FOREIGN PATENT DOCUMENTS

DE  295 05 761 UI  9/1996

(Continued)

OTHER PUBLICATIONS

"A New Cost Effective Method to Confer Tailored Breathability and Liquid Barrier Properties to Nonwovens", J. C. Cardinal & Y. Trouilet, Index 93 Congress, Application Session 7A, Adding Value to Nonwovens, Mar. 1993.

(Continued)

*Primary Examiner*—Elizabeth M. Cole
*Assistant Examiner*—Jennifer Steele

(57) ABSTRACT

A substantially liquid impermeable moisture vapor permeable laminate structure comprising:
(i) a substrate layer comprising a woven or non-woven material,
(ii) a moisture vapor control layer attached to said substrate,
(iii) a tie layer comprising one or more copolymers comprising from about 30 to about 90 weight percent ethylene co-monomer units and from about 10 to about 70 weight percent vinyl acetate co-monomer units, and
(iv) a layer comprising one or more copolyetherester(s) in an amount of at least 50 weight percent based on the total amount of polymer in the layer.

The moisture vapor transmission rate (MVTR) in the direction away from the copolyetherester-containing layer and tie layer and towards the substrate is preferably greater than the MVTR in the direction away from the substrate layer and towards the tie layer and copolyetherester-containing layer.

10 Claims, 2 Drawing Sheets

U.S. PATENT DOCUMENTS

| | | |
|---|---|---|
| 5,472,760 A | 12/1995 | Norvell |
| 5,532,053 A | 7/1996 | Mueller |
| 5,827,252 A | 10/1998 | Werenicz et al. |
| 5,859,083 A | 1/1999 | Spijkers et al. |
| 6,028,019 A | 2/2000 | Spijkers et al. |
| 6,214,477 B1 * | 4/2001 | Wofford et al. ............ 428/34.9 |

FOREIGN PATENT DOCUMENTS

| | | |
|---|---|---|
| EP | 0 295 694 B1 | 12/1988 |
| EP | 0 611 037 A1 | 8/1994 |
| EP | 0 963 760 A1 | 12/1999 |
| EP | 0 964 026 A1 | 12/1999 |

OTHER PUBLICATIONS

Komiya Yuji, "Preparation of Laminated Body", Patent Abstracts of Japan, Publication No. 56056846, Pubication Date May 19, 1981.

Patent Abstracts of Japan, vol. 1998, No. 01, Jan. 30, 1998, JP 09 242208 A (Jieibetsuku KK), Sep. 16, 1997.

* cited by examiner

LAMINATE STRUCTURE

This application claims benefit of priority from Provisional Application No. 60/156,168 filed Sep. 27, 1999.

BACKGROUND OF THE INVENTION

1. Field of the Invention

This invention relates to a laminate or multilayer polymeric film structure which is useful as a substantially liquid impermeable moisture vapor permeable membrane. In particular, the invention relates to a multilayer polymeric film structure comprising a substrate layer, a tie layer and a layer comprising a copolyetherester, wherein the structure has differential permeability.

2. Description of the Related Art

The outer walls and roof of a building usually include a layer of an insulation material. Further, wood is still commonly used in the construction industry particularly in the construction of buildings such as houses and the roofs of houses. The transmission of moisture vapor between the interior and exterior of buildings may result in the condensation of moisture vapor, and hence the build-up of deposits of moisture, in or on the insulation material and wood-containing elements of the building, which can cause considerable damage thereto. It is therefore of particular importance to prevent moisture build-up from coming into contact with the insulation materials and wood-containing elements in a building in order to keep them as dry as possible. In many countries, there exist building regulations which control this aspect of construction.

Polyolefin microporous membranes are of use in the construction industry, for example as roof or wall liners. Under all climatic conditions, it is desirable to control moisture vapor transfer across the walls or the roof of a building to prevent moisture build-up. Usually such membranes having a defined moisture vapor transmission rate (MVTR) are used to line the insulation material in buildings and are designed to control moisture vapor transfer in the building in winter, when the moisture vapor transfer is from the interior of the building to its exterior.

So-called breathable fabrics composed of a film of a polymeric material that is permeable to moisture vapor bonded to a textile material are also known. A notable and successful material that transmits moisture vapor therethrough is a film of microporous polytetrafluoroethylene that is adhered to a textile material. Although this product has been very successful, it is rather expensive and the pores tend to be blocked by dirt, body oils and detergents. It is known that other polymers can be formed into films that have a high moisture vapor transmission rate (MVTR) and, when covered with textile materials such as nylon or poly (ethylene terephthalate), can be used to make waterproof and water vapor permeable garments. U.S. Pat. No. 4,493,870 discloses waterproof garments made of a textile material covered with a single layered film of a copolyetherester made from a dicarboxylic acid, an aliphatic diol and a poly(alkylene oxide)glycol wherein at least 70% of the glycol has a carbon to oxygen ratio of 2.0-2.4. Such waterproof garments described therein have MVTR values that do not depend on which surface of the film faces the high humidity side. The values obtained are equal when either side is exposed to the same level of humidity.

EP-A-0611037 discloses a process for making a laminate usable in protective clothing, diapers, and roof underliners. In the process, a moisture vapor permeable, liquid impermeable, barrier layer with a thickness of 3 to 25 µm is coextruded with a 1 to 5 µm thick release layer on one side of the barrier layer and a 1 to 5 µm thick tie layer on the opposite side of the barrier layer. The tie layer is adhered to a porous substrate such as a woven or nonwoven fabric. The tie layer typically comprises a thermoplastic such as an ethylene copolymer or a polyurethane and serves to improve the adherence between the porous substrate and the breathable thermoplastic barrier layer.

U.S. Pat. No. 4,725,481 discloses a waterproof water vapor permeable film for use as surgical drape and in waterproof garments having rapid transmission of moisture vapor through the film toward the exterior or weather-side of the garment, while minimizing the transmission of water in the opposite direction, making the garment more comfortable to wear due to the increase in the MVTR away from the wearer while protecting the wearer from water, liquid and vapor from exterior sources. In particular, U.S. Pat. No. 4,725,481 discloses a bicomponent film of a hydrophobic layer and a hydrophilic layer of copolyetherester elastomers bonded together which permits differential transfer of moisture vapor to prevent buildup of moisture, the bicomponent film having a separation ratio for moisture vapor of at least 1.2 as determined by ASTM E96-66 (Procedure BW).

The separation ratio for moisture vapor refers to the MVTR measured with the hydrophilic layer of the bicomponent film next to the water surface divided by the MVTR of the bicomponent film with the hydrophobic layer next to the water surface, as described in ASTM E96-66 (Procedure BW), run at 22° C. The bicomponent film of U.S. Pat. No. 4,725,481 has a much higher MVTR, as measured by ASTM E96-66 (Procedure BW), when moisture vapor passes in the direction of the hydrophilic layer and then through the hydrophobic layer of the bicomponent structure, as contrasted to the passage of moisture vapor from the hydrophobic layer and then through the hydrophilic layer. These bicomponent films behave like a permeability valve. The permeability of the bicomponent film is not linear with vapor pressure (relative humidity). As the relative humidity is increased, the hydrophilic layer absorbs water in an amount determined by its composition which causes it to swell and become more permeable. The water swell capability of the copolyetherester increases with an increase in the weight percent of the long-chain ester units in the polymer. As a consequence, when the hydrophilic layer is next to the water source, the value of the MVTR is about two to three times higher than when the hydrophobic layer is next to the water source.

The use of waterproof moisture vapor permeable membranes in the construction industry is problematic since the materials suitable for such membranes are often incompatible with the base material or substrate, which is often made of a polyolefin. In other words, it is often not possible to provide adequate adhesion between these two layers such that the laminate product has a high resistance to delamination. This is especially the case when it is desired to produce a laminate having a thin water permeable membrane. In addition it is particularly difficult to maintain the integrity of the mechanical bond between the waterproof moisture vapor membrane and the substrate in a high moisture environment, since the waterproof moisture vapor permeable membrane can swell up to 40%.

Further, while waterproof moisture vapor permeable membranes may successfully control moisture vapor transfer in buildings in winter, those membranes do not work in the summer in regions where the climatic conditions reverse the vapor flow so the moisture vapor transfer is from the exterior of the building to its interior. Rather, under those conditions the membranes cause an undesirable moisture build-up in the roof or wall cavity of the building. Typically, such climatic conditions exist in semi-tropical regions, which have high temperature and humidity in the summer and low temperatures, typically well below 0° C., in the winter.

Laminated structures are almost exclusively manufactured by a process which involves the application of heat and/or pressure, such as a melt extrusion coating process or a conventional lamination process. It is considered that one reason for the poor adhesion of incompatible polymer resin and substrate combinations, especially when thin membranes are required, is that the molten polymer resin coating may cool too rapidly to allow for sufficient time for it to interact with the surface of the substrate and create strong adhesion. There must generally be sufficiently high penetration of the molten polymer resin coating into the interstices and porous structure of the substrate to ensure a good bond. In addition, rapid cooling of the polymer resin coating may cause the polymer coating to solidify before forming a layer of consistent thickness and this is, again, especially a problem when thin membranes are required. It is considered that, typically, the adhesion between an incompatible polymer resin coating and substrate consists predominantly of mechanical bonding, with little or no chemical bonding.

It is an object of this invention to provide a substantially liquid impermeable moisture vapor permeable membrane which has good adhesion between the substrate and polymer coating layer, particularly a thin polymer coating layer, and particularly a membrane having differential permeability.

DEFINITIONS

Figure 1:
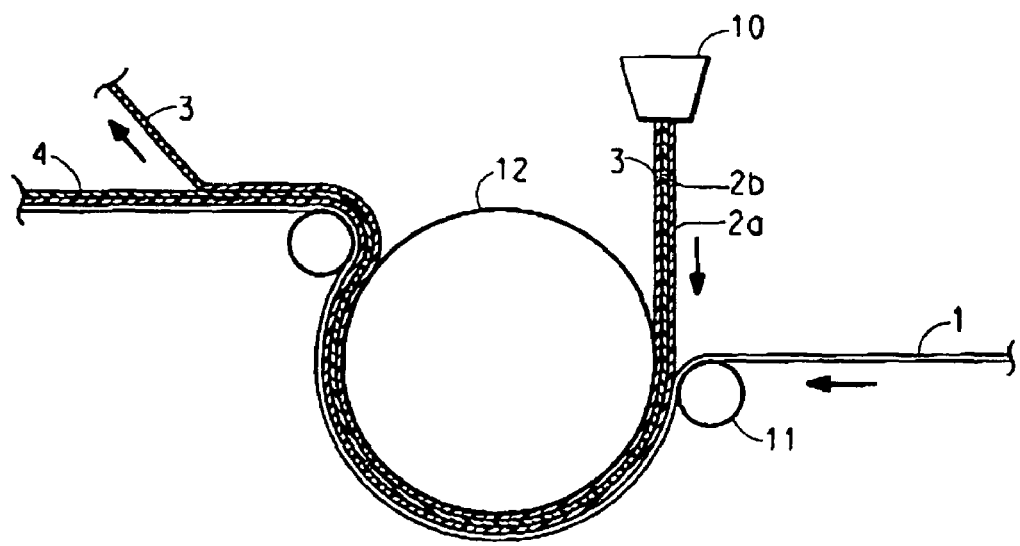
FIG. 1 is a schematic view showing the preferred coextrusion process for the production of a laminate structure according to the invention.

The term "polymer" as used herein, generally includes but is not limited to, homopolymers, copolymers (such as for example, block, graft, random and alternating copolymers), terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "polyolefin" as used herein, is intended to mean any of a series of largely saturated polymeric hydrocarbons composed only of carbon and hydrogen. Typical polyolefins include, but are not limited to, polyethylene, polypropylene, polymethylpentene and various combinations of the monomers ethylene, propylene, and methylpentene.

The term "polyethylene" as used herein is intended to encompass not only homopolymers of ethylene, but also copolymers wherein at least 85% of the recurring units are ethylene units.

The term "polypropylene" as used herein is intended to encompass not only homopolymers of propylene, but also copolymers wherein at least 85% of the recurring units are propylene units.

The term "nonwoven fabric, sheet or web" as used herein means a structure of individual fibers or threads that are positioned in a random manner to form a planar material without an identifiable pattern, as in a knitted fabric.

DETAILED DESCRIPTION

According to a first aspect of the invention, there is provided a laminate structure comprising:
(i) a substrate layer comprising a woven or non-woven material,
(ii) a moisture vapor control layer attached to said substrate,
(iii) a tie layer comprising one or more copolymers comprising from about 30 to about 90 weight percent ethylene co-monomer units and from about 10 to about 70 weight percent vinyl acetate co-monomer units, and
(iv) a layer comprising one or more copolyetherester(s) in an amount of at least 50 weight percent based on the total amount of polymer in the layer.

For the avoidance of doubt, the order of the layers relative to each other is as follows. The moisture vapor control layer is adjacent the substrate; the tie layer is adjacent the moisture vapor control layer, and the layer comprising the copolyetherester(s) is adjacent the tie layer on the surface of the tie layer which is remote from the substrate.

According to the preferred embodiment of the invention, the control layer is positioned between the substrate and the tie layer, with the control layer comprising a polymer capable of reducing the moisture vapor transmission rate (MVTR) of the laminate structure. MVTR is measured according to ASTM E96-66 (Procedure BW). Typically, the control layer is such that the MVTR of the laminate structure containing the control layer is 5 to 10, and preferably 20, times less than the MVTR of the laminate structure without the control layer. When the optional control layer is included in the laminate structure, said structure acts as a vapor control layer whose function is described in more detail below.

The laminate structure is substantially liquid impermeable and moisture vapor permeable and has the advantage that the copolyetherester-containing layer is strongly adhered to the substrate.

The laminate structure has the further advantage that it is capable of exhibiting differential permeability, i.e. the MVTR in one direction through the layers of the laminate is greater than the MVTR in the opposite direction. Thus, the tie layer comprising the poly(ethylene vinyl acetate) not only functions to improve adhesion but also, in combination with the copolyetherester-containing layer, enables the structure to exhibit differential permeability.

Another advantage the tie layer provides is that it helps to shield and protect the copolyetherester-containing layer. In certain end-uses contemplated for the present invention, the laminate structure may be exposed to various weather conditions, including rain. Since the copolyetherester-containing layer tends to be hygroscopic, it may swell when exposed to water. The tie layer can minimize the potential for swelling, by helping to shield the copolyetherester-containing layer from water.

Moreover, the tie layer lends resistance to flame propagation to the laminate structure. Tests indicate that laminate structures according to the present invention pass various flame tests that structures not having the tie layer would fail.

While not wishing to be bound by theory, it is believed that improved flame resistance is a result of the polymer in the tie layer having a lower melting point than the material of the substrate. Upon exposure to flame, the tie layer begins to burn first. However, at the temperature the tie layer burns, the substrate layer only melts. As the substrate layer melts, it extinguishes the tie layer. The net effect is a surprising resistance to flame propagation that structures not having a tie layer will tend not to possess.

In the laminate structures of the present invention, the MVTR in the direction away from the copolyetherester-containing layer and tie layer and towards the substrate (referred to in Formula (1) below as $MVTR_{CAS}$) is greater than the MVTR in the direction away from the substrate layer and towards the tie layer and copolyetherester-containing layer (referred to in Formula (1) below as $MVTR_{SAC}$). The MVTR ratio may be expressed as:

$$MVTR_{CAS}/MVTR_{SAC} \qquad \text{(Formula 1)}$$

In a preferred embodiment, the MVTR ratio of the laminates of the present invention is at least about 1.5 and is preferably from about 2 to about 10.

The MVTR of each layer is primarily dependent upon the chemical composition of the layer and the thickness of the layer, and these parameters can be adjusted to tailor a laminate so that it is suitable for a particular end-use, as required.

In a preferred embodiment of the invention, the MVTR of the tie layer is from about 100 to about 2000, preferably from about 150 to about 1500, gm·mil/m$^2$/24 hrs according to ASTM E96-66 (Procedure BW); and the combined MVTR of the copolyetherester-containing layer and the tie layer is at least about 2500, preferably at least about 3500, and more preferably from about 3500 to about 20000, gm·mil/m$^2$/24 hrs according to ASTM E96-66 (Procedure BW).

It is preferred that the tie layer has a thickness less than that of the layer comprising the copolyetherester(s). Preferably the thickness of the tie layer is from about 1 μm to about 20 μm, preferably from about 1 μm to about 8 μm, and more preferably from about 1 μm to about 5 μm. Preferably the thickness of the layer comprising the copolyetherester(s) is from about 5 μm to about 100 μm, preferably from about 10 μm to about 50 μm, and more preferably from about 12 μm to about 30 μm.

According to a further aspect of the invention, there is provided a laminate structure comprising:
(i) a substrate layer comprising a woven or non-woven material,
(ii) a tie layer comprising one or more copolymers comprising from about 30 to about 90 weight percent ethylene co-monomer units and from about 10 to about 70 weight percent vinyl acetate co-monomer units, and
(iii) a layer comprising one or more copolyetherester(s), wherein the amount of said copolymer comprising ethylene and vinyl acetate in the tie layer and the amount of copolyetherester(s) in the copolyetherester-containing layer is sufficient to provide an MVTR ratio of at least 1.5.

The moisture vapor control layer positioned between the substrate and the tie layer preferably comprises a polymer film layer that is capable of reducing the MVTR of the laminate structure. Typically, the control layer is such that the MVTR of the laminate structure containing the control layer is 5 to 10, and preferably 20, times less than the MVTR of the laminate structure without the control layer. This applies both to the $MVTR_{CAS}$ and the $MVTR_{SAC}$ as defined above.

The substrate of the laminates according to the present invention may be any woven or non-woven material. It is preferably a non-woven, and preferably a spun-bonded material. It may comprise at least 50, particularly at least 65, particularly at least 90, and particularly at least 99, weight percent polyolefin. Preferably the polyolefin is polyethylene or polypropylene. The polyolefin may contain minor amounts of other co-monomer units but should contain at least 50, particularly at least 65, particularly at least 90, and particularly at least 99, weight percent of olefin repeating units. In one embodiment, at least 50, particularly at least 65, particularly at least 90, and particularly at least 99, weight percent of the fibers are polyolefin fibers. Alternatively, the substrate may be polyester. The present invention also comprehends substrates that contain blends of the aforementioned materials.

In a further embodiment, the substrate may be any material which when attached via mechanical and/or chemical bonding to a copolyetherester in a conventional manner would ordinarily have a bonding strength of less than 1 N/m as defined by ISO 2411. As used herein, the term "spun-bonded material" means nonwoven fabrics formed by filaments which have been extruded, drawn, and then laid on a continuous belt. Bonding is accomplished by several methods such as by hot-roll calendering or by passing the web through a saturated-steam chamber at an elevated pressure. An example of a spun-bonded nonwoven polyolefin useful in the invention is Typar® spundbonded polypropylene, available from E.I. du Pont de Nemours and Company. An example of polyesters useful in the invention are Sawabond® 4303 and Sawabond® 4342, available from Christian Heinrich Sandler GmbH & Co.

The tie layer performs the function of adhering the copolyetherester polymer coating to the substrate. In other words, the tie layer is capable of compatabilizing the substrate and the copolyetherester polymer and forms a strong bond to both the substrate and the copolyetherester polymer. In a preferred embodiment, the tie layer comprises one or more copolymers comprising from about 60 to about 85 weight percent, preferably from about 67 to about 77 weight percent, ethylene co-monomer units and from about 15 to about 40 weight percent, preferably from about 23 to about 33 weight percent, vinyl acetate co-monomer units. Commercially available materials of this type include ELVAX® (E. I. du Pont de Nemours and Company). Other co-monomer units may be present in the copolymer in minor amounts, provided the above-stated amounts of ethylene and vinyl acetate units are also present.

The tie layer may further comprise conventional additives known in the art. The amount of said copolymer comprising ethylene and vinyl acetate present in the tie layer is preferably at least 80, more preferably at least 85, more preferably at least 95, and most preferably substantially 100, weight percent of the tie layer.

The layer comprising the copolyetherester(s) contains at least 50 weight percent, preferably at least 65 weight percent, preferably at least 80 weight percent, more preferably at least 90 weight percent, and particularly at least 99 weight percent of the copolyetherester(s) based on the weight of polymer in that layer. The copolyetherester(s) are generally hydrophilic, as described in more detail below.

The viscosity of the copolyetheresters is preferably less than about 3000 Pa·s and preferably at least 20 Pa·s, measured according to the standard ISO11443. Preferably, the viscosity is in the range from about 20 to about 2000 Pa·s, more preferably from about 40 to about 1000 Pa·s, and more preferably from about 50 to about 700 Pa·s, measured according to the standard ISO11443. The viscosity in Pa·s is measured according to the standard ISO11443 as a function of shear rate in sec$^{-1}$ and temperature. The temperatures used in the measurement of viscosity are from a minimum of just above the melting (or softening) point of the polymer (typically from about 200 to about 210° C.) up to a maximum of just above the temperatures (typically from about 230 to about 260° C., particularly from about 240 to about 250° C.) used in the processing methods (for example, coextrusion, injection molding and lamination) of thermoplastic materials. The temperatures used in the processing of thermoplastics are generally from about 20 to about 50° C., and particularly from about 40 to about 50° C., above the melting point of the thermoplastic. The shear rates used in the measurement of viscosity were from about 10 to about 10000 sec$^{-1}$, which encompass those typically encountered in the processing methods of thermoplastic materials.

In one embodiment of the invention, the viscosity of the copolyetheresters is preferably less than about 3000 Pa·s, preferably at least 20 Pa·s, preferably from about 20 to about 2000 Pa·s, more preferably from about 40 to about 1000 Pa·s, and more preferably from about 50 to about 700 Pa·s, in the temperature range from about 200 to about 250° C., as measured according to the standard ISO11443. In an alternative embodiment, the viscosity of the copolyetheresters is less than about 3000 Pa·s, preferably at least 20 Pa·s, preferably from about 20 to about 2000 Pa·s, more preferably from about 40 to about 1000 Pa·s, and more preferably from about 50 to about 700 Pa·s, at a temperature 20 to 35° C. below the processing temperature used to manufacture a laminate of the invention, as measured according to the standard ISO11443. In this embodiment, reference to "the processing temperature used to manufacture a laminate of the invention" is preferably a reference to the extrusion temperature used in the preferred coextrusion coating process described herein.

Preferably, the melting point of the copolyetheresters is greater than 120° C., usually from about 120° C. to above about 220° C. If the melting point of the copolyetherester is less than about 120° C., then the polymer is tacky and difficult to handle in film form; and if the melting point is more than about 220° C., then the films become excessively stiff. The melting points are determined by differential scanning calorimetry (DSC) in accordance with the standard ISO 3146.

In one embodiment of the invention, the copolyetherester elastomer(s) are selected from those described in U.S. Pat. No. 4,725,481, the disclosure of which is incorporated herein by reference.

In a preferred embodiment, the copolyetherester elastomer(s) have a multiplicity of recurring long-chain ester units and short-chain ester units joined head-to-tail through ester linkages, said long-chain ester units being represented by the formula:

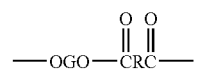

(I)

and said short-chain ester units being represented by the formula:

(II)

wherein

G is a divalent radical remaining after the removal of terminal hydroxyl groups from a poly(alkylene oxide)glycol having an average molecular weight of about 400-3500, wherein the amount of ethylene oxide groups incorporated in said one or more copolyetheresters by the poly(alkylene oxide)glycol is from about 20 to about 68 weight percent, preferably from about 25 to about 68 weight percent, based upon the total weight of the copolyetherester(s);

R is a divalent radical remaining after removal of carboxyl groups from a dicarboxylic acid having a molecular weight less than about 300;

D is a divalent radical remaining after removal of hydroxyl groups from a diol having a molecular weight less than about 250;

wherein said copolyetherester(s) contain from about 25 to about 80 weight percent short-chain ester units.

It is preferred that said copolyetherester(s) have a moisture vapor transmission rate (MVTR) of at least about 2500, preferably at least about 3500, and more preferably from about 3500 to about 20000, gm·mil/m$^2$/24 hrs according to ASTM E96-66 (Procedure BW).

The invention will now be described with reference to the copolyetherester(s) of the preferred embodiment.

As used herein, the term "ethylene oxide groups incorporated in the copolyetherester(s)" means the weight percent in the total copolyetherester(s) of (CH$_2$—CH$_2$—O—) groups in the long-chain ester units. The ethylene oxide groups in the copolyetherester that are counted to determine the amount in the polymer are those derived from the poly(alkylene oxide)glycol and not ethylene oxide groups introduced into he copolyetherester by means of a low molecular weight diol.

As used herein, the term "long-chain ester units" as applied to units in a polymer chain refers to the reaction product of a long-chain glycol with a dicarboxylic acid. Suitable long-chain glycols are poly(alkylene oxide)glycols having terminal (or as nearly terminal as possible) hydroxy groups and having a molecular weight of from about 400 to about 3500, particularly from about 600 to about 1500.

The poly(alkylene oxide)glycols used to make the copolyetheresters should contain ethylene oxide groups in amounts that result in a copolyetherester having from about 20 to about 68, preferably from about 25 to about 68, more preferably from about 30 to about 55, weight percent ethylene oxide groups, based on the total weight of the copolyetherester. The ethylene oxide groups cause the polymer to have the characteristic of being readily permeable to moisture vapor and, generally, the higher the percentage of ethylene oxide in the copolyetherester, the higher degree of water permeability. Random or block copolymers of ethylene oxide containing minor portions of a second poly(alkylene oxide)glycol can be used. Generally, if a second monomer is present, the second monomer will constitute less than about 30 mol percent of the poly(alkylene oxide) glycols, and usually less than about 20 mol percent. Representative long-chain glycols include poly(ethylene oxide) glycol, ethylene-oxide capped polypropylene oxide glycol, mixtures of poly(ethylene oxide)glycol with other glycols such as ethylene oxide capped poly(propylene oxide)glycols and/or poly(tetramethylene oxide)glycol provided the resulting copolyetherester has an amount of ethylene oxide groups of at least about 25 weight percent. Copolyetheresters prepared from poly(ethylene oxide)glycols having a molecular weight of from about 600 to 1500 are preferred because they provide a combination of superior moisture vapor permeability and limited water swell and, when formed into a film, they exhibit useful properties over a wide temperature range.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (MW below about 250) with a dicarboxylic acid to form ester units represented by Formula (II) above.

Included among the low molecular weight diols which react to form short-chain ester units suitable for use for preparing copolyetheresters are acyclic, alicyclic and aromatic dihydroxy compounds. Preferred compounds are diols with 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, most especially 1,4-butanediol. Included among the bisphenols which can be used are bis(p-hydroxy)diphenyl, bis(p-hydroxyphenyl)methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol and not to its derivatives.

Dicarboxylic acids which are reacted with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes acid equivalents of dicarboxylic acids having two functional carboxyl groups which perform substantially like dicarboxylic acids in reaction with glycols and diols in forming copolyetherester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyetherester polymer formation and use of the polymer in the compositions of this invention.

The term "aliphatic dicarboxylic acids", as used herein, means carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used are sebacic acid, 1,3-cyclohexane dicarboxylic acid, 1,4-cyclohexane dicarboxylic acid, adipic acid, glutaric acid, 4-cyclohexane-1,2-dicarboxylic acid, 2-ethylsuberic acid, cyclopentanedicarboxylic acid decahydro-1,5-naphthylene dicarboxylic acid, 4,4,'-bicyclohexyl dicarboxylic acid, decahydro-2,6-naphthylene dicarboxylic acid, 4,4,'-methylenebis(cyclohexyl) carboxylic acid, 3,4-furan dicarboxylic acid. Preferred acids are cyclohexane-dicarboxylic acids and adipic acid.

Representative aromatic dicarboxylic acids include phthalic, terephthalic and isophthalic acids, bibenzoic acid, substituted dicarboxy compounds with two benzene nuclei such as bis(p-carboxyphenyl)methane, p-oxy-1,5-naphthalene dicarboxylic acid, 2,6-naphthalene dicarboxylic acid, 2,7-naphthalene dicarboxylic acid, 4,4,'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used providing an aromatic dicarboxylic acid is also present.

Aromatic dicarboxylic acids are a preferred class for preparing the copolyetherester polymers useful for this invention. Among the aromatic acids, those with 8-16 carbon atoms are preferred, particularly terephthalic acid alone or with a mixture of phthalic and/or isophthalic acids.

The copolyetheresters contain about 25-80 weight percent short-chain ester units corresponding to Formula (II) above, the remainder being long-chain ester units corresponding to Formula (I) above. When the copolyetheresters contain less than about 25 weight percent short-chain ester units, then the crystallization rate becomes very slow and the copolyetherester is tacky and difficult to handle. When more than about 80 weight percent short-chain ester units are present, then the copolyetheresters generally become two stiff. The copolyetheresters preferably contain about 30-60, preferably about 40-60, weight percent short-chain ester units the remainder being long-chain ester units. In general, as the percent short-chain ester units in the copolyetherester are increased, the polymer has a higher tensile strength and modulus, and the moisture vapor transmission rate decreases. Most preferably, at least about 70% of the groups represented by R in Formulae (I) and (II) above are 1,4-phenylene radicals and at least about 70% of the groups represented by D in Formula (II) above are 1,4-butylene radicals and the sum of the percentages of R groups which are not 1,4-phenylene radicals and D groups which are not 1,4-butylene radicals does not exceed 30%. If a second dicarboxylic acid is used to make the copolyetherester, isophthalic acid is the acid of choice and if a second low molecular weight diol is used, 1,4-butenediol or hexamethylene glycol are the diols of choice.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units.

The MVTR of the copolyetheresters can be regulated by various means. The thickness of a layer of copolyetherester has an effect on the MVTR in that the thinner the layer the higher the MVTR. An increase in the percent of short-chain ester units in the copolyetherester results in a decrease in the MVTR, but also results in an increase in the tensile strength of the layer due to the fact the polymer is more crystalline.

The Young's moduli of the copolyetherester elastomers preferably are from 1000 to 14,000 psi, usually 2000 to 10,000 psi, as determined by ASTM Method D-412. The modulus can be controlled by the ratio of short-chain segments to long-chain segments of the copolyetherester elastomer, and co-monomer choice for preparation of the copolyetherester. Copolyetheresters having a relatively low modulus generally confer better stretch recovery and aesthetics to the laminate structure where the stiffness and drape of the structure are important.

Preferably, the copolyetherester elastomers are prepared from esters or mixtures of esters of terephthalic acid and isophthalic acid, 1,4-butanediol and poly(tetramethylene ether)glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, e.g. dimethylterephthalate, 1,4-butanediol and poly(ethylene oxide)glycol.

The dicarboxylic acids or their derivatives and the polymeric glycol are incorporated into the final product in the same molar proportions as are present in the reaction mixture. The amount of low molecular weight diol actually incorporated corresponds to the difference between the moles of diacid and polymeric glycol present in the reaction mixture. When mixtures of low molecular weight diols are employed, the amounts of each diol incorporated is largely a function of the amounts of the diols present, their boiling points, and relative reactivities. The total amount of glycol incorporated is still the difference between moles of diacid and polymeric glycol. The copolyetherester elastomers described herein can be made conveniently by a conventional ester interchange reaction. A preferred procedure involves heating the ester of an aromatic acid, e.g., dimethyl ester of terephthalic acid, with the poly(alkylene oxide) glycol and a molar excess of the low molecular weight diol, 1,4-butanediol, in the presence of a catalyst at 150°-160° C., followed by distilling off methanol formed by the interchange reaction. Heating is continued until methanol evolution is complete. Depending on temperature, catalyst and glycol excess, this polymerization is complete within a few minutes to a few hours. This product results in the preparation of a low molecular weight prepolymer which can be carried to a high molecular weight copolyetherester by the procedure described below. Such prepolymers can also be prepared by a number of alternate esterification or ester interchange processes; for example, the long-chain glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols as above, or from the free acids with the diol acetates. Alternatively, the short-chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long-chain glycol.

The resulting prepolymer is then carried to high molecular weight by distillation of the excess of short-chain diol. This process is known as "polycondensation". Additional ester interchange occurs during this distillation to increase the molecular weight and to randomize the arrangement of the copolyetherester units. Best results are usually obtained if this final distillation or polycondensation is run at less than 1 mm pressure and 240°-260° C. for less than 2 hours in the presence of antioxidants such as 1,6-bis-(3,5-di-tert-butyl-4-hydroxyphenol)propionamido]-hexane or 1,3,5-trimethyl-2,4,6-tris[3,5-di-tertiary-butyl-4-hydroxybenzyl]benzene.

Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol, are conveniently removed during polymerization by azeotropic distillation. Other special polymerization techniques for example, interfacial polymerization of bisphenol with bisacylhalides and bisacylhalide capped linear diols, may be useful for preparation of specific polymers. Both batch and continuous methods can be used for any stage of copolyetherester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyetheresters possess many desirable properties, it is sometimes advisable to stabilize these compositions further against heat or light produced degradation. This is readily achieved by incorporating stabilizers in the copolyetherester compositions. Satisfactory stabilizers comprise phenols, especially hindered phenols and their derivatives, amines and their derivative, especially arylamines.

Representative phenol derivatives useful as stabilizers include 4,4,'-bis(2,6-di-tertiarybutylphenol); 1,3,5-trimethyl-2,4,6-tris[3,5-ditertiary-butyl-4-hydroxybenzyl]benzene and 1,6-bis[3,5-di-tert-butyl-4-hydroxyphenyl)propionamido]hexane. Mixtures of hindered phenols with co-stabilizers such as diaurylthiodipropionate or phosphites are particularly useful. Improvement in light stability occurs by the addition of small amounts of pigments or the incorporation of a light stabilizer, such as benzotriazole ultraviolet light absorbers. The addition of hindered amine photo-stabilizers, such as bis(1,2,2,6,6-pentamethyl-4-piperidinyl) n-butyl-(3,5-di-tert-butyl-4-hydroxybenzyl)malonate, usually in amounts of from 0.05-1.0% by weight of the copolyetherester, are particularly useful in preparing compositions having resistance to photodegradation.

Various conventional fillers can be added to the copolyetheresters usually in amounts of from about 1-10 percent by weight based on the total weight of the copolyetherester(s) and fillers only. Fillers such as clay, talc, alumina, carbon black and silica can be used, the latter being preferred, and white and light colored pigments can be added to the polymers. In general, these additives have the effect of increasing the modulus at various elongations.

Regarding the optional control layer that can be incorporated into the laminate structure of the invention, there is no specific limitation on the polymer which may be used in said layer provided that the control layer has the effect of reducing the MVTR of the laminate structure and that the control layer is compatible with both the substrate and the tie layer. Typically, the control layer is such that the MVTR of the laminate structure containing the control layer is 5 to 10, and preferably 20, times less than the MVTR of the laminate structure without the control layer. Therefore the polymer should have a relatively low MVTR. Examples of suitable polymers include polyethylene or polypropylene or a copolymer thereof comprising ethylene and/or propylene as the main repeating units. A typical thickness of the control layer is from 2 to 15 µm, preferably from 10 to 15 µm.

Formation of a laminate according to the invention may be effected by conventional techniques well-known in the art.

Processes for the extrusion melt coating of a polymer resin onto non-woven or other substrates are well known. The process generally involves the steps of heating the polymer to a temperature above its melting point, extruding it through a flat die onto a substrate which passes through the curtain of molten polymer, subjecting the coated substrate to pressure to effect adhesion, and then cooling. The extrusion melt coating method is widely used since it allows economical production of a laminated structure in a one-step procedure.

Conveniently, formation of the laminate structure of the invention, optionally including the control layer, is effected by coextrusion of the respective layers onto the substrate, either by simultaneous coextrusion of the respective layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing onto the substrate.

Conventional laminating techniques may also be used, for example by lamination of a preformed copolyetherester-containing layer and a preformed tie layer, or a preformed copolyetherester-containing layer, a preformed tie layer and a preformed control layer, either before or simultaneously with lamination thereof with the substrate, or by casting. Typically, such lamination techniques would involve thermal lamination of the respective layers on hot roll calendering equipment, wherein the temperature used to bond the layers to the substrate is sufficient to effect melting or softening of one or more layers, and with the application of sufficient pressure, the layers become bonded.

Preferably, the process is an extrusion coating process wherein the tie layer is coextruded with said copolyetherester-containing layer, or, if the control layer is included, wherein the control layer, the tie layer, and the copolyetherester-containing layer are coextruded together.

A particularly preferred process for preparing the laminates of the invention is set out below. This process is of particular use for preparing laminates having a high resistance to delamination, i.e. good adhesion between the substrate and the tie layer and/or good adhesion between the tie layer and the copolyetherester-containing layer. This process is especially of use when it is desired to produce a laminate comprising a substrate having thereon a thin copolyetherester-containing layer.

A further advantage of the preferred process is that the formation of pinholes in the polymeric coating is minimized. It is important to prevent pinholes and provide a continuous coating layer, for instance to ensure that the laminate structure is substantially liquid impermeable. Pinholing arises since the substrate generally consists of a coarse or porous material. During coating and subsequent pressing, the molten polymer enters the pores or interstices of the substrate and, as a result, the polymer coating may become disrupted by undulations or fibrous projections on the surface of the substrate. Pinholing is a particular problem in the production of thin polymer resin coatings, and to avoid pinholing in such coatings it is generally required to obtain a low penetration of the polymer resin into the substrate. Since good adhesion is generally dependent upon a high penetration, it is a problem to obtain a pinhole-free thin polymer coating which is strongly adhered to the substrate. Pinholing may also be a problem with lower viscosity polymers. Typically, when the viscosity is below a certain level, the molten polymer will more readily flow into the interstices and pores of the substrate which, when the polymer coating is a thin layer coating, will increase the likelihood of pinholing.

One way of minimizing the problems of poor adhesion and pinholing is to increase the thickness of the polymer resin layer. It is considered that a thicker resin layer has the effect of maintaining the temperature at the interface of the polymer coating and the substrate, which would allow a stronger bond to be formed. In addition, a thicker resin layer would be less susceptible to disruption by irregularities in the substrate and therefore be less susceptible to pinholing. However, increasing the thickness of the polymer resin layer is economically disadvantageous and is not always appropriate for the end-use of the product. As noted above, it is sometimes desirable that the laminate product comprise a thin polymer film layer. For example, in water vapor permeable membranes the additional thickness reduces the moisture vapor transmission rate. In addition, as the thickness of the polymer coating is increased, the desirable characteristics of the substrate are lost, for instance, the laminate structure may become unmanageably stiff and hard.

The preferred process for the preparation of a laminate according to the present invention involves the use of a peelable release layer during manufacturing. The process comprises the steps of forming or providing a substrate layer and providing on a surface thereof a tie layer and a copolyetherester-containing layer in the order as hereinbefore described, and further providing on the surface of the copolyetherester-containing layer remote from the tie layer, a peelable release layer. Preferably, the process is an extrusion coating process wherein the tie layer is coextruded with said copolyetherester-containing layer and the peelable release layer. Again, if the optional control layer is included in the laminate, the control layer is provided between the substrate and the tie layer. If the process used is a coextrusion process, then the control layer is coextruded with the tie layer, the copolyetherester-containing layer, and the peelable release layer.

The preferred process for the preparation of a laminate according to the invention optionally comprises one or more of the further steps of (i) removing the release layer, either on-line subsequent to cooling of the laminate, or at a later stage after transportation of the laminate; and (ii) recycling the release layer once it has been removed from the laminate.

The peelable release layer must have peelability with respect to the copolyetherester-containing layer, and preferably is co-extrudable therewith. An important requirement of the peelable release layer is that its viscosity must be similar to that of the copolyetheresters at the processing temperatures involved in the manufacture of the laminate. The peelable release layer generally comprises a polymer resin, typically polyethylene or polypropylene or a copolymer thereof comprising ethylene and/or propylene as the main repeating units. In a preferred embodiment the release layer comprises low density polyethylene (LDPE). An example of a suitable LDPE is STAMYLAN® 8108 from DSM.

The thickness of the peelable release layer will depend on the thickness of the copolyetherester-containing layer. It is important that the peelable release layer be sufficiently thick to ensure adequate penetration of the copolyetherester-containing layer into the structure of the substrate. It is also important that the peelable release layer be sufficiently thick that it is capable of being peeled from the copolyetherester-containing layer. However, if the release layer is too thick then pinholing results. The thickness of the release layer should be less than the thickness of the copolyetherester-containing layer. Preferably, the thickness of the release layer should be no more than about 90%, and more preferably no more than about 80%, of the thickness of the copolyetherester-containing layer. Preferably, the thickness of the release layer is at least 5%, preferably at least 15%, and preferably at least 30%, of the thickness of the copolyetherester-containing layer. In other words, where $T_{RL}$ is the thickness of the release layer and $T_{CL}$ is the thickness of the copolyetherester-containing layer, then $T_{RL}/T_{CL}$ must be less than 1, preferably less than about 0.9 and more preferably less than about 0.8. Preferably, $T_{RL}/T_{CL}$ is greater than about 0.05, preferably greater than about 0.15, and preferably greater than about 0.3. In a preferred embodiment, $T_{RL}/T_{CL}$ is about 0.8.

The peelable release layer may provide one or more of the following benefits:

(a) It may act as a heat control layer for the purpose of controlling the temperature and therefore the flow of the polymer coating during the coating process. In other words, the release layer provides additional thermal capacity to the polymer coating layer, which allows the coating layer to stay at a higher temperature, and therefore molten, for longer. It is believed that this extended duration of melt provides additional time for the polymer to flow into any interstices of the substrate thereby improving mechanical adhesion. In some cases, the additional heat may initiate or increase melting of the interface between the polymer resin and substrate, thereby increasing adhesion strength. Variation of the thickness and composition of the release layer, and temperature thereof, will permit modulation of the cooling time and flow of the polymer coating, which, in turn, will permit greater control over the adhesion strength between the polymer resin and substrate. It will also permit greater control over the coating quality, particularly in terms of the evenness of the thermoplastic polymer resin layer thickness, to enable the production of a more consistent laminate.

(b) It may act as a protective layer to reduce fouling of the copolyetherester-containing layer, for instance, during later stages of the manufacturing process or during transportation; or to reduce undesirable sticking of the copolyetherester-containing layer to equipment during subsequent processing.

(c) An additional benefit of the reduction in undesirable sticking of the copolyetherester-containing layer to equipment is that it may allow the process to run at higher speeds, typically greater than 100 m/min and often at least 150 m/min.

(d) It may act to reduce pinholes, as well as bubbles other defects, in the polymer coating. If the polymer coating at the stage of the process involving the application of pressure to the coated substrate, (e.g. by a calender roll) is still too "soft", the nip pressure can force air through the coating, which could result in pinholes produced by pockets of air or bubbles which may have become entrapped and pressurized during the coating process and which have subsequently burst in the coated substrate. The use of a peelable release layer may provide resistance to the entrapment of pockets of air in the coating, which may therefore enable the production of a more consistent laminate.

It is not, of course, intended that the invention be limited by the theories set out under (a) and (d) above.

In the preferred embodiment of the invention, good bond strength is obtained between the film layer and the substrate, even when the film layer is very thin. In a preferred embodiment of the invention, where the film layer is comprised primarily of a copolyetherester and the substrate is a nonwoven comprised primarily of polyolefin fibers, it is preferred that the laminate material of the invention exhibit a bonding strength of at least 0.1 N/m. More preferably, the bonding strength of the laminate material is a least 1 N/m, and more preferably at least 2 N/m. According to an even more preferred embodiment of the invention, where the film layer is comprised primarily of a copolyetherester with a thickness of less than 50 µm and the substrate is a nonwoven comprised primarily of polyolefin fibers, the bonding strength between the film and the substrate is at least 3 N/m, and more preferably at least 5 N/m, and even more preferably at least 8 N/m, and most preferably at least 10 N/m.

According to a further aspect of the invention, there is provided a laminate structure comprising:

(i) a first substrate layer comprising a woven or non-woven material, (ii) a tie layer comprising one or more copolymers comprising from about 30 to about 90 weight percent ethylene co-monomer units and from about 10 to about 70 weight percent vinyl acetate co-monomer units, (iii) a layer comprising one or more copolyetherester(s) in an amount of at least 50 weight percent based on the total amount of polymer in the layer, (iv) an adhesive or primer, and (v) a second substrate layer comprising a woven or non-woven material.

For the avoidance of doubt, the order of the layers relative to each other is as follows. The tie layer is adjacent the first substrate; the copolyetherester-containing layer is adjacent the tie layer on the surface of the tie layer which is remote from the first substrate; the adhesive or primer is adjacent the copolyetherester-containing layer on the surface of the copolyetherester-containing layer which is remote from the tie layer; and the second substrate layer is adjacent the adhesive or primer on the surface of the adhesive or primer which is remote from the copolyetherester-containing layer.

The substrate layers, the tie layer and the copolyetherester-containing layer are as hereinbefore described.

The adhesive or primer may be any conventional adhesive known in the art, such as a polyurethane-based adhesive. A suitable adhesive is LIOFOL® (UK4501; Henkel). The adhesive or primer is applied to the fibers of the second substrate layer and should not form a continuous layer therein.

If the second substrate layer contains about 40 weight percent or more of polyester, the adhesive or primer layer can be omitted in many cases. It has been found that such substrates tend to form a durable bond with the copolyetherester-containing layer, avoiding the need for adhesive or primer. While not wishing to be bound by theory, it is believed that similarities in the polyester components in the second substrate layer and in the copolyetherester-containing layer lead to a durable bond.

In other words, the laminate structure may comprise:

(i) a substrate layer comprising a woven or non-woven material, (ii) a tie layer comprising one or more copolymers comprising from about 30 to about 90 weight percent ethylene co-monomer units and from about 10 to about 70 weight percent vinyl acetate co-monomer units, (iii) a layer comprising one or more copolyetherester(s) in an amount of at least 50 weight percent based on the total amount of polymer in the layer, and (iv) a second substrate layer comprising at least 40 weight percent polyester.

An advantage of such a structure is in its simplified manufacturing process. It addition, it saves the cost of primer or adhesive, which will at least partially offset the higher costs of polyester over polyolefin substrates.

This laminate structure which comprises two substrate layers may be prepared in accordance with conventional techniques, as described above, i.e. by conventional lamination or extrusion processes, or a combination thereof. The preferred process which utilizes a peelable release layer may also be used, and the second substrate layer adhered to the three-layer structure as hereinbefore described after removal of the peelable layer. Preferably, however, the process of manufacture is completed on-line in a one-step process comprising forming the three-layer structure as hereinbefore described by coextrusion as hereinbefore described and contacting the second substrate layer and adhesive or primer (if required) therewith under the application of pressure and/or heat to effect adhesion.

The laminate which comprises two substrate layers is of particular use in situations where the laminate is required to have additional mechanical strength. In addition, the second substrate layer provides the copolyetherester-containing layer with protection against scratching, marking and abrasion.

Turning now to the drawings, and referring to FIG. 1, the tie layer (2a), the copolyetherester-containing layer (2b) and the peelable release layer (3) are coextruded from the extruder (10) onto the substrate (1). The coated substrate is pressed between nip roll (11) and chill roll (12). The release layer (3) is peeled off onto a separate roller (not shown) for recycling or disposal and the finished laminate (4) rolled onto a further roller (not shown).

Figure 2:
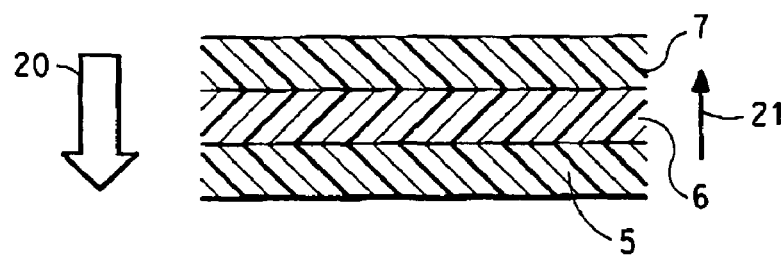
FIG. 2 is a sectional view of a three-layer laminate according to the first aspect of the invention.

Referring to FIG. 2, the laminate structure includes a substrate (5), a tie layer (6) and a copolyetherester-containing layer (7). Arrow (20) in FIG. 2 refers to the principal direction of transmission of moisture vapor. There is reduced transmission of moisture vapor in the direction of arrow (21).

Figure 3:
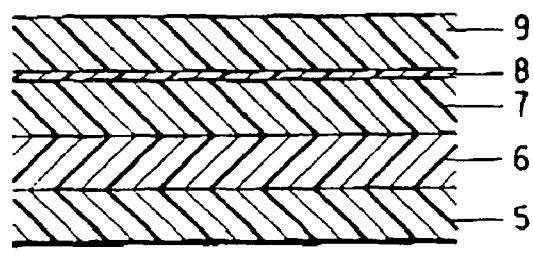
FIG. 3 is a sectional view of a laminate containing a second substrate layer according to a further aspect of the invention.

Referring to FIG. 3, the laminate structure includes a first substrate layer (5), a tie layer (6), a copolyetherester-containing layer (7), an adhesive or primer (8) and a second substrate layer (9).

Figure 4:
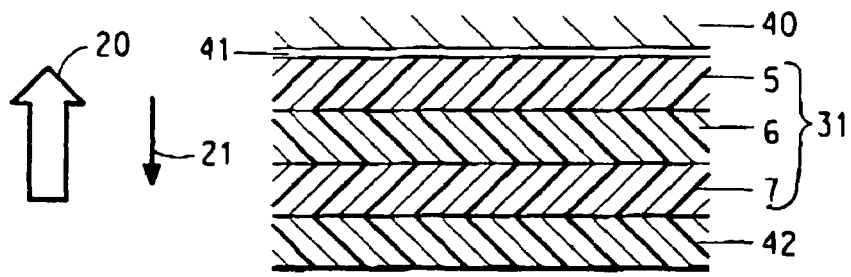
FIGS. 4 and 5 are sectional views of constructions involving laminates according to the invention.
Figure 5:
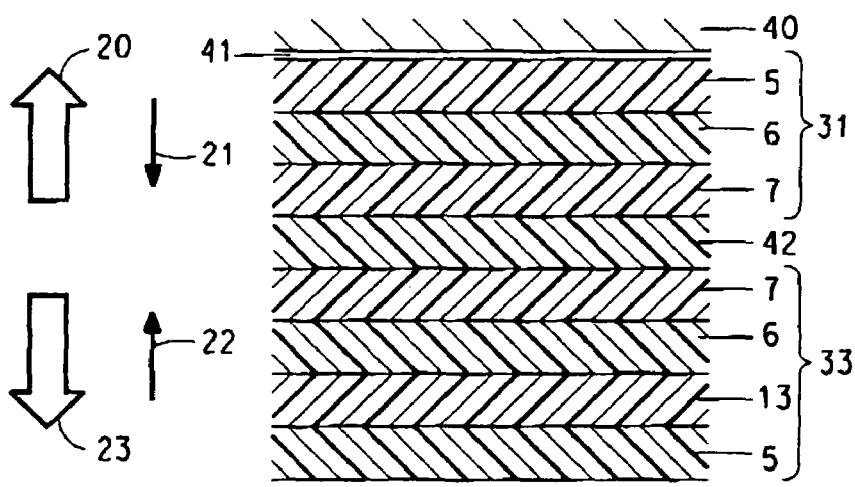

Turning now to FIGS. 4-5 there are shown various constructions using the laminate structures of the invention. FIG. 4 shows a laminate structure of the invention which is used as a roof or wall liner. Referring to FIG. 4, the sectional view is part of a roof or a wall construction comprising an outer tiling or siding layer (40), a ventilated gap (41), a liner (31) and an insulation layer (42). The insulation layer (42) is in contact with the liner (31). Liner (31) is a laminate structure of the invention and includes a substrate (5), a tie layer (6) and a copolyetherester-containing layer (7). Air flows in gap (41) between liner (31) and outer tiling or siding layer (40).

FIG. 5 shows a first laminate structure of the invention which is used as a roof or wall liner and a second laminate structure of the invention which includes a control layer and which is used as a vapor control layer. Referring to FIG. 5, the sectional view is part of a preferred roof or wall construction which includes an outer layer (40) of tiles or siding, a ventilated gap (41), a liner (31), an insulation layer (42) and a vapor control layer (33).

Liner (31) is a laminate structure of the invention that includes a substrate (5), a tie layer (6) and a copolyetherester-containing layer (7), with the copolyetherester-containing layer (7) side of liner (31) being in contact with insulation layer (42). Vapor control layer (33) includes a substrate (5), a control layer (13), a tie layer (6) and a copolyetherester-containing layer (7) with the copolyetherester-containing layer (7) side of vapor control layer (33) being in contact with insulation layer (42). Copolyetherester-containing layer (7) of vapor control layer (33), i.e. of the second laminate structure, need not necessarily be substantially liquid impermeable. The reason for this is that copolyetherester-containing layer (7) of vapor control layer (33) generally will not come into contact with liquids in the end-uses contemplated for the laminate structure of FIG. 5.

Figure 6:
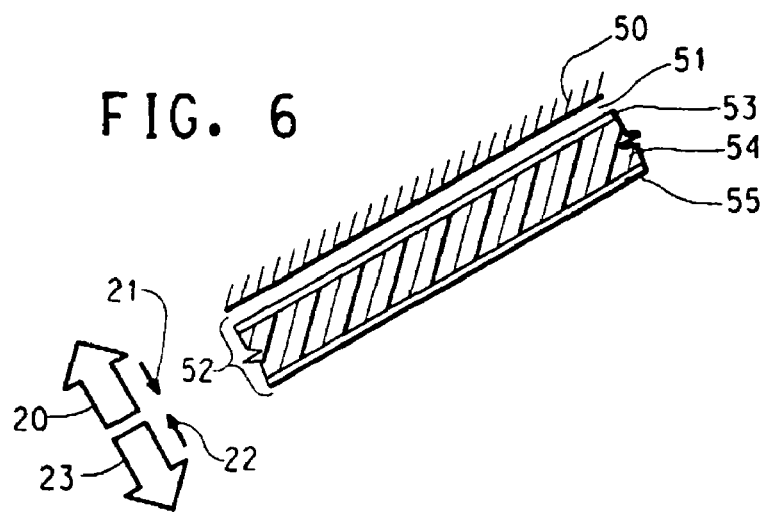
FIG. 6 is a sectional view of another aspect of the invention which includes a construction of a first laminate, an insulation material and a second laminate.

FIG. 6 is directed to another aspect of this invention and shows a sectional view of part of a roof or wall construction that includes an outer tile or wall layer (50), a ventilated gap (51), and an inventive insulation system (52) that comprises a liner (53), an insulation layer (54) and vapor control layer (55).

Liner (53) is a laminate structure that is capable of exhibiting differential permeability, i.e. the MVTR in one direction through the layers of the laminate is greater than the MVTR in the opposite direction. The laminate structure includes at least two layers adhered together, with the first layer being a substrate as described above and the second layer being a substantially liquid impermeable moisture vapor permeable membrane.

The substrate may be any woven or non-woven material, preferably a non-woven, and preferably a spun-bonded material, as described above. The substantially liquid impermeable moisture vapor permeable membrane comprises a thermoplastic polymer material that can be extruded as a thin, continuous, nonporous, substantially liquid impermeable, moisture vapor permeable layer. Preferably, the extruded membrane layer is less than 25 microns thick, and more preferably less than 15 microns thick, and most preferably less than 10 microns thick. The membrane is preferably comprised of a block polyether copolymer such as a block polyether ester copolymer as described above, a polyetheramide copolymer, a polyurethane copolymer, a poly(etherimide) ester copolymer, a polyvinyl alcohol, or a combination thereof. Suitable copolyether amide polymers are copolyamides available under the name Pebax® from Atochem Inc. of Glen Rock, N.J., USA. Pebax® is a registered trademark of Elf Atochem, S.A. of Paris, France. Suitable polyurethanes are thermoplastic urethanes available under the name Estane from The B.F. Goodrich Company of Cleveland, Ohio, USA. Suitable copoly(etherimide) esters are described in Hoeschele et al. U.S. Pat. No. 4,868,062. The membrane is comprised of preferably at least 50% by weight, more preferably at least 75% by weight, of polymers selected from the group of block copolyether esters, block copolyether amides, copolyether imide esters, polyurethanes, and polyvinyl alcohol.

Liner (53) is formed as a laminate by conventional techniques as described above. In use liner (53) is positioned so that the substantially liquid impermeable moisture vapor permeable membrane side of liner (53) is against insulation layer (54) so that the MVTR in the direction away from the membrane and towards the substrate ($MVTR_{CAS}$) is greater than the MVTR in the direction away from the substrate layer and towards the membrane ($MVTR_{SAC}$). In a preferred embodiment, the MVTR ratio of liner (53) is at least about 1.5 and is preferably from about 2 to about 10.

The MVTR of each layer is primarily dependent upon the chemical composition of the layer and the thickness of the layer, and these parameters can be adjusted to tailor the MVTR of liner (53) as required. Other additional layers of polymers or other materials may be added to liner (53) provided the MVTR ratio of liner (53) is within the range described above. In one embodiment, liner (53) may be the same as laminate structure (31).

Insulation layer (54) is a thermal insulation material and may be, for example, glass fiber, extruded or expanded polystyrene, mineral wool, cellulose fiber, or the like.

Vapor control layer (55) is a laminate structure that is capable of exhibiting differential permeability, i.e. the MVTR in one direction through the layers of the laminate is greater than the MVTR in the opposite direction and may be constructed in the same as described above for liner (53) except that the moisture vapor permeable membrane does not necessarily need to be substantially liquid impermeable. However, vapor control layer (55) may include an additional optional control layer positioned between the substrate and the moisture vapor permeable membrane. There is no specific limitation on the polymer which may be used in the control layer provided that when incorporated in vapor control layer (55), the control layer has the effect of reducing the MVTR of the vapor control layer (55) and that the control layer is compatible with both the substrate and the moisture vapor permeable membrane. Typically, the control layer is such that the MVTR of vapor control layer (55) containing the control layer is 5 to 10, and preferably 20, times less than the MVTR of the vapor control layer (55) without the control layer. Therefore the polymer used in the control layer should have a relatively low MVTR. Examples of suitable polymers include polyethylene or polypropylene or a copolymer thereof comprising ethylene and/or propylene as the main repeating units. A typical thickness of the control layer is from 2 to 15 µm, preferably from 10 to 15 µm.

In use vapor control layer (55) is positioned so that the moisture vapor permeable membrane side of vapor control layer (55) is against insulation layer (54) so that the MVTR in the direction away from the membrane and towards the substrate ($MVTR_{CAS}$) is greater than the MVTR in the direction away from the substrate layer and towards the membrane ($MVTR_{SAC}$). In a preferred embodiment, the MVTR ratio of vapor control layer (55) is at least about 1.5 and is preferably from about 2 to about 10. Like liner (53), the chemical composition and the thickness of the layers of vapor control layer (55) can be adjusted to tailor the MVTR of layer (55). Other additional layers of polymers or other materials may be added to vapor control layer (55) provided the MVTR ratio of vapor control layer (55) is within the range described above. Vapor control layer (55) may be the same as vapor control layer (33).

The primary purposes of the roof/wall insulated construction depicted in FIGS. 5 and 6 is to keep insulation layer (42) or (54) dry and to keep layer (42) or (54) free from any drafts or air convection which could adversely affect the heat insulation proved by insulation layer (42) or (54). Layer (42) and (54) need to be kept dry because if there is a disadvantageous build up of moisture or condensation in those layers, mold and mildew can develop.

The way in which liner (31) and vapor control layer (33) keep insulation layer (42) dry is described below. Insulation layer (42) is protected from drafts and air convection by liner (31) which has zero air permeability and thus functions as a wind barrier.

In the winter vapor control layer (33) minimizes the flow of vapor from the inside of the building to the outside (arrow 22), thus preventing any condensation from occurring on the cold side of insulation layer (42). Vapor control layer (33) acts as a "brake" to prevent moisture and vapor from moving in the direction of arrow 22. At the same time, liner (31) allows moisture to move toward the exterior of the building (arrow 20), thus preventing any moisture build-up in insulation layer (42).

In contrast to conventional moisture control systems, the construction shown in FIGS. 5-6 also controls moisture and vapor build up in insulation layer (42) when the vapor pressure gradient is oriented from the outside of a building to the inside. Where there is high humidity and temperature on the exterior of a building, such as in semi-tropical regions in the summer, the direction of the vapor pressure gradient across the construction shown in FIG. 5 is the opposite of the vapor pressure gradient in winter, and water vapor can be transmitted from the exterior of a building to its interior and it is therefore desirable to control transmission of water vapor from the exterior of a building to the interior. In the construction shown in FIG. 5, liner (31) reduces the transmission of moisture vapor in the direction of arrow (21), and vapor control layer (33) transmits moisture and vapor toward the interior of the building (arrow 23), thereby preventing any moisture build-up.

The same kind of vapor or moisture relief mechanism can also occur when there is no vapor pressure difference between the inside and outside of the building. In new construction or after repair of a leak, there might be moisture accumulated in the roof or wall of the building. In this case the hydrophilic layer (7) of liner (31) and/or vapor control layer (33) reacts to the high moisture level and allows the moisture and vapor to be transmitted out of the wall or roof, thereby optimizing the drying of the roof or wall.

The way in which liner (53) and vapor control layer (55) keep insulation layer (54) dry is that same as that described above for liner (31), vapor control layer (33) and insulation layer (42).

The construction shown in FIG. 5 using the laminated structures of the invention and in FIG. 6 using insulation system (52) perform the function of removing vapor and moisture throughout all seasons of the year without the formation of undesirable condensation, that is, the construction is capable of functioning irrespective of the natural direction of the vapor pressure gradient across the insulated system. Previous designs of insulated systems having moisture control only worked when the vapor pressure gradient was from outside to inside the building, or from inside to outside, but not in both direction.

The invention is further illustrated by the following examples. It will be appreciated that the examples are for illustrative purposes only and are not intended to limit the invention as described above. Modification of detail may be made without departing from the scope of the invention.

EXAMPLES

A series of laminates were prepared using a peelable release layer in an extrusion coating process according to the invention. A series of Comparative Examples was also prepared without the use of a peelable release layer.

In the examples, the substrate was either a polypropylene (PP) nonwoven or a polyethylene (PE) nonwoven. The substrates used in the examples were 55 cm wide. The PP nonwoven substrate was Xavan® 5217-B spunbonded polypropylene sheet with a basis weight of 85 g/m² (available from E. I. du Pont de Nemours and Company). The PE nonwoven was Tyvek® 1460B with a basis weight of 60 g/m² (available from E. I. du Pont de Nemours and Company). A tie layer comprising ELVAX® 3175 (a copolymer comprising about 72% ethylene and about 28% vinyl acetate; available from E. I. du Pont de Nemours and Company) was utilized in some of the examples. The peelable release layer was LDPE (STAMYLAN® 8108; available from DSM).

The copolyetherester-containing layer used in each of the examples was ACTIVE MEMBRANE AM6000® (E. I. du Pont de Nemours and Company). AM 6000® is a hydrophilic copolyetherester containing 45 weight percent 1,4-butylene terephthalate, and 55 weight percent ethylene oxide/propylene oxide copolyether terephthalate. The copoly(alkylene oxide) glycol used to make the copolyetherester was obtained by end-capping poly(propylene ether) glycol with 64 weight percent ethylene oxide, and had a molecular weight of about 2100. The copolyetherester had a calculated ethylene oxide content of 33 weight percent, and contained 45 weight percent short-chain ester units. The polymer had a melting point of 200° C. The resin was dried in a dehumidifying dryer (either 8 hours at 80° C. or 2 hours at 210° C.) prior to use.

Comparative Example 1

A copolyetherester film of the AM 6000® polymer was extrusion coated onto the PP nonwoven substrate described above using an extrusion lamination apparatus like that described above with regard to FIG. 1. The substrate was corona treated at 2 kW prior to the extrusion coating. The copolyetherester resin was fed in pellet form into a 2.5 inch (6.4 cm) diameter, 40 HP screw extruder that was connected to a BAC three layer melt combining block. In this comparative example, the only polymer melt fed to the melt bloc was the copolyetherester. The copolyetherester polymer was fed to the melt bloc at a melt temperature of 250° C. The melt was extruded as a molten film through a 705 mm long die having a die gap of 0.7 mm. The molten film was coated on the PP nonwoven substrate without the application of an adhesive. The PP nonwoven substrate was spaced 150 mm below the opening of the die. The PP substrate and molten film layer were immediately pressed between a chill roll and a nip roll. The chill roll was a 750 mm diameter, chrome plated, water cooled ($T_{min}$=8° C.) chill roll and the nip roll was a roll with a silicone rubber surface having an 80 Shore A hardness. The nip pressure was maintained at 27 kg/linear cm. The nonwoven was fed into the nip at a line speed of 100 m/min. After the film was cooled on the rotating chill roll, the laminate was removed from the chill roll by a transfer roll from which the laminate was fed to a take-up roll. A substrate with a 25 μm thick film layer was obtained. As summarized in Table 1, the bond strength between the substrate and the film layer was negligible.

Comparative Example 2

A copolyetherester film of the AM 6000® polymer was extrusion coated onto the PP nonwoven substrate described above according to the process of Comparative Example 1 except that the polymer melt feed rate was increased so as to obtain a 40 μm thick copolyetherester film layer. As summarized in Table 1, below, the bond strength between the substrate and the film layer was negligible.

Example 1

A copolyetherester film of the AM 6000® polymer was extrusion coated onto the PP nonwoven substrate described above according to the process of Comparative Example 1, with the following additional steps. An EVA tie layer (ELVAX® 3175; E. I. du Pont de Nemours and Company) was extruded from a 2.5 inch (64 mm) diameter, 40 HP screw extruder that was also connected to the BAC three layer melt combining block. The EVA polymer was fed to the melt bloc at a melt temperature of 240° C. A bi-component molten film with the copolyetherester as the A layer and the LDPE as the C layer was extruded through the die. The molten film was brought into contact with the corona treated PP substrate as described in Comparative Example 1, with the EVA side of the film facing the PP substrate. The laminate removed from the chill roll had a 25 μm thick copolyetherester film layer and a 3 μm thick EVA film tie layer between the copolyetherester layer and the PP substrate. As summarized in Table 1, the bond strength between the substrate and the film layer was 2.3 N/m.

Example 2

A copolyetherester film of the AM 6000® polymer was extrusion coated onto the PP nonwoven substrate described above according to the process of Example 1, with the following additional steps. A low density polyethylene was (STAMYLAN® 8108 LDPE from DSM) was extruded from a 3.5 inch (90 mm) diameter, 150 HP screw extruder that was also connected to the BAC three layer melt combining block. The LDPE polymer was fed to the melt bloc at a melt temperature of 250° C. A three-component molten film, with the copolyetherester layer A sandwiched between the LDPE layer B on one side and the EVA layer C on the opposite side, was extruded through the die. The molten film was brought into contact with the corona treated PP substrate as described in Comparative Example 1, with the EVA side of the film facing the PP substrate. The laminate removed from the chill roll had a 3 μm thick film EVA layer adhered between the PP substrate and a 25 μm thick copolyetherester film layer. A 2 μm thick LDPE film layer was adhered to the opposite side of the copolyetherester layer. The LDPE film layer was peeled off of the copolyetherester layer leaving a PP substrate/EVA film/copolyetherester film laminate. As summarized in Table 1, the bond strength between the substrate and the film layer was 3.6 N/m.

Example 3

A copolyetherester film of the AM 6000® polymer was extrusion coated onto the corona treated PP nonwoven substrate described above according to the process of Example 2, except that the melt feed rate for the LDPE polymer was increased so as to obtain a 20 μm thick LDPE film layer. As summarized in Table 1, with this change, the bond strength between the substrate and the film layer was such that the polymer film failed before the film delaminated from the substrate. The tear strength of the polymer film, measured according to ASTM D1004, exceeds 100 N/m.

The MVTR ratio of the laminate of Example 4, with the peelable release layer removed, was measured as follows. Using the standard test NF G52 ("up cup" method at a temperature of 32° C.), the MVTR wherein the substrate was facing humidity was measured at 1076 gm/m²/24 hrs, and the MVTR wherein the copolyetherester-containing layer was facing humidity was measured at 2328 gm/m²/24 hrs. The MVTR ratio is therefore 2.16.

Comparative Example 3

A copolyetherester film of the AM 6000® polymer was extrusion coated onto the nonwoven substrate according to the process of Comparative Example 1, except that a corona treated polyethylene nonwoven substrate (Tyvek® 1460B; from E. I. du Pont de Nemours and Company) was used in place of the PP nonwoven substrate. As summarized in Table 1, the bond strength between the substrate and the film layer was negligible.

Example 4

A copolyetherester film of the AM 6000® polymer was extrusion coated onto the nonwoven substrate according to the process of Example 3, except for the following changes. A polyethylene corona treated nonwoven substrate (Tyvek® 1460B; from E. I. du Pont de Nemours and Company) was used in place of the PP nonwoven substrate. In addition, the thickness of the ELVAX® tie layer was extruded as a 4 μm thick film layer instead of the 3 μm thick film layer of Example 3. As summarized in Table 1, with this change, the bond strength between the substrate and the film layer was such that the TYVEK® substrate delaminated before the film delaminated from the substrate.

The bonding strength was measured for each of the laminates described in the examples above according to standard test ISO 2411. The results are shown in Table 1.

TABLE 1

| | Substrate | Tie Layer (thickness) | Polymer Resin (thickness) | Release Layer (thickness) | Bonding Strength (N/m) |
|---|---|---|---|---|---|
| Comparative Example 1 | PP | — | AM6000 (25 μm) | — | <0.02 |
| Comparative Example 2 | PP | — | AM6000 (40 μm) | — | <0.02 |
| Example 1 | PP | ELVAX (3 μm) | AM6000 (25 μm) | — | 2.3 |
| Example 2 | PP | ELVAX (3 μm) | AM6000 (25 μm) | LDPE (2 μm) | 3.6 |
| Example 3 | PP | ELVAX (3 μm) | AM6000 (25 μm) | LDPE (20 μm) | A |
| Comparative Example 3 | PE | — | AM6000 (25 μm) | — | <0.02 |
| Example 4 | PE | ELVAX (4 μm) | AM6000 (25 μm) | LDPE (20 μm) | B | a: polymer coating destroyed (bonding strength > polymer coating strength)
b: substrate destroyed (bonding strength > substrate strength)

The test data presented in Table 1 show that a laminate having good adhesion between the polymer coating and the substrate can be provided even when the polymer coating has very low thickness.

The invention claimed is:

1. A laminate structure comprising:
   (i) a substrate layer comprising a woven or non-woven material,
   (ii) a moisture vapor control layer comprised of a polymer film attached to said substrate and adjacent to said substrate,
   (iii) a tie layer comprising one or more copolymers comprising from about 30 to about 90 weight percent ethylene co-monomer units and from about 10 to about 70 weight percent vinyl acetate co-monomer units, said tie layer being adjacent to said moisture vapor control layer such that said moisture vapor control layer is positioned between said substrate layer and said tie layer, and
   (iv) a copolyetherester layer comprising one or more copolyetheresters in an amount of at least 50 weight percent based on the total amount of polymer in the layer, said copolyetherester containing layer being adjacent to said tie layer and on a surface of the tie layer remote from the substrate layer,
   (v) an adhesive or primer adjacent the copolyetherester-containing layer on the a surface of the copolyetherester-containing layer remote from the tie layer, and
   (vi) a second substrate layer comprising at least 50 weight percent of a polyolefin, said second substrate layer being adjacent to the adhesive or primer on a surface of the adhesive or primer remote from the copolyester-ester-containing layer,
wherein said laminate structure has an $MVTR_{CAS}$ > $MVTR_{SAC}$, wherein the $MVTR_{CAS}$ is the MVTR in the direction away from the copoloyetherester-containing layer and tie layer and towards the substrate layer, and the $MVTR_{SAC}$ is the MVTR in the direction away from the substrate layer and towards the tie layer and copoloyetherester-containing layer.

2. A laminate structure according to claim 1, wherein the moisture vapor control layer is comprised of polyethylene, polypropylene, or a copolymer thereof comprising ethylene and/or propylene as the main repeating units.

3. A laminate structure according to claim 1 wherein said moisture vapor control layer has a thickness of from 1 to 5 μm.

4. A laminate structure according to claim 1 wherein the thickness of the copolyetherester layer is from about 12 μm to about 30 μm and the thickness of the tie layer is from about 1 μm to about 5 μm.

5. A laminate structure according to claim 4 wherein the non-woven material comprises polyethylene, polypropylene, polyester or blends thereof.

6. A laminate structure according to claim 5 wherein the bonding strength between the substrate layer, the moisture vapor control layer, the tie layer and the copolyetherester-containing layer, measured according to ISO 2411, is at least 1 N/m.

7. A laminate structure according to claim 6 wherein the tie layer comprises one or more copolymers comprising 67-77 weight percent ethylene co-monomer units and 23-33 weight percent, vinyl acetate co-monomer units.

8. A laminate structure according claim 1 wherein the layer comprising the copolyetherester(s) contains at least 90 weight percent of the copolyetherester(s) based on the weight of polymer in that layer.

9. A laminate structure according to claim 1 wherein the ratio of $MVTR_{CAS}/MVTR_{SAC}$ is at least about 1.5.

10. A laminate structure according to claim 1 in which the second substrate layer comprises a non woven or woven material.

* * * * *